No. 697,344. Patented Apr. 8, 1902.
F. J. LELAND.
EYELET.
(Application filed June 13, 1901.)
(No Model.)
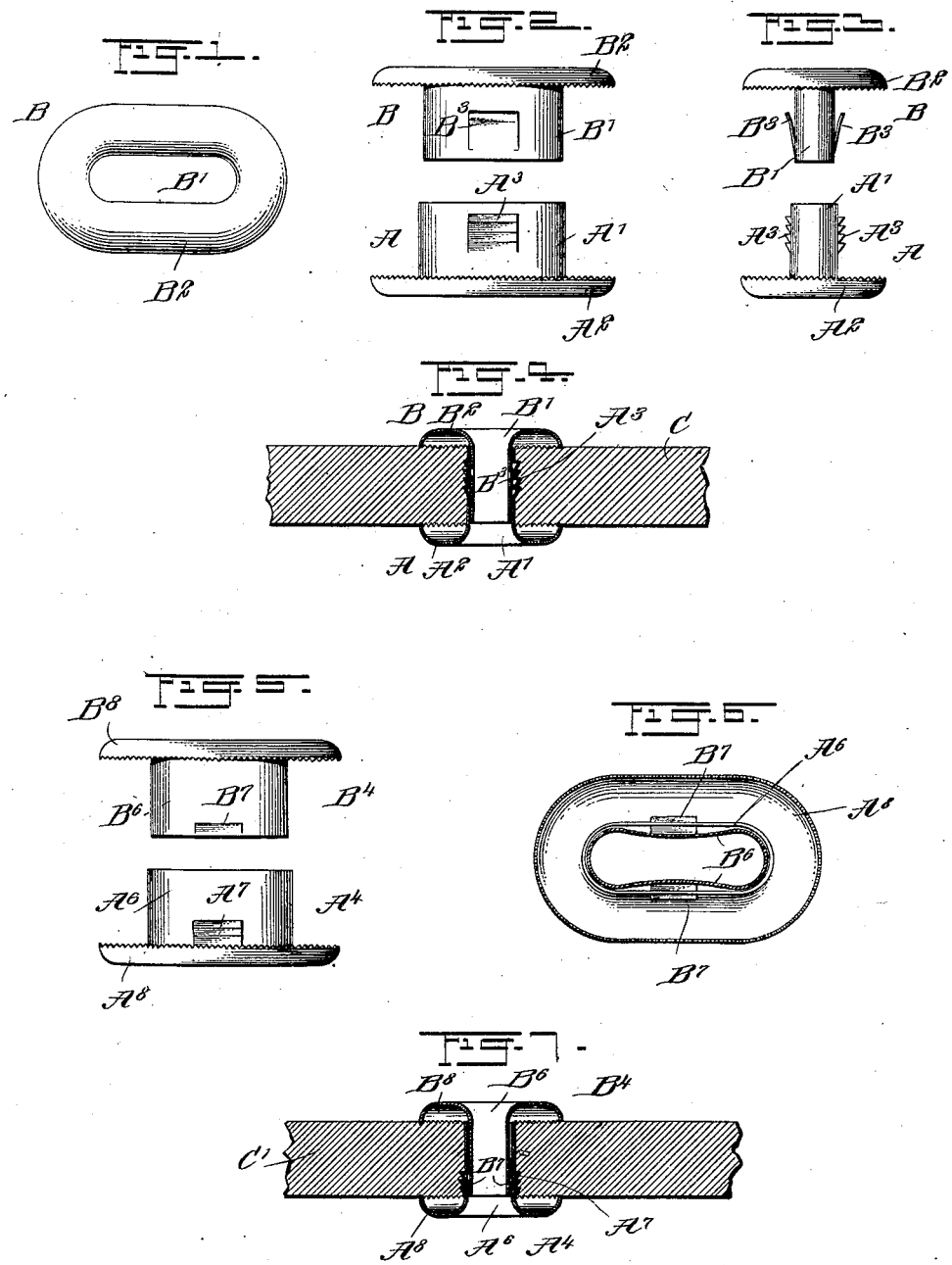
WITNESSES:
INVENTOR
Frank J. Leland
BY
ATTORNEYS
THE NORRIS PETERS CO., PHOTO-LITHO., WASHINGTON, D. C.

UNITED STATES PATENT OFFICE.

FRANK JAMES LELAND, OF KNOXVILLE, TENNESSEE.

EYELET.

SPECIFICATION forming part of Letters Patent No. 697,344, dated April 8, 1902.

Application filed June 13, 1901. Serial No. 64,390. (No model.)

*To all whom it may concern:*

Be it known that I, FRANK JAMES LELAND, a citizen of the United States, and a resident of Knoxville, in the county of Knox and State of Tennessee, have invented a new and Improved Belt-Eyelet, of which the following is a full, clear, and exact description.

The invention relates to devices for lacing the ends of belts; and its object is to provide a new and improved eyelet which is simple and durable in construction, easily applied, and arranged to preserve the ends of the belt from wear or damage.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement. Fig. 2 is a side elevation of the improvement, showing the members separated. Fig. 3 is an edge view of the same. Fig. 4 is a cross-section of the improvement as applied. Fig. 5 is a side elevation of a modified form of the improvement with the members separated. Fig. 6 is a sectional plan view of the same, one of the members appearing partially pushed into the other member; and Fig. 7 is a cross-section of the modification as applied.

The belt-eyelet (illustrated in Figs. 1 to 4, inclusive) consists, essentially, of members A and B, of which the member B has a tubular shank B', adapted to be pushed into the correspondingly-shaped shank A' of the member A. The shanks A' B' are formed with integral heads $A^2$ $B^2$, respectively, in the shape of flanges curved inward, the edges of the flanges being serrated, so as to readily engage the material of the belt C when the members are pushed one into the other, as is plainly indicated in Fig. 4. On the front and rear of the shank B' are formed tongues $B^3$, adapted to engage shoulders $A^3$, formed on the front and rear of the shank A', at the time the member B is pushed home in the member A, so that the tongues $B^3$ are interlocked with corresponding shoulders $A^3$ to securely hold the members A and B in a locked position on the belt C.

As indicated in Figs. 2 and 3, the tongues $B^3$ extend upward and outward, so that the shank B' readily passes into the shank A', the resiliency of the tongues $B^3$ causing the same to snap into the corresponding shoulders $A^3$ when the members are completely driven home on the belt.

In the modified form (shown in Figs. 5, 6, and 7) the members $A^4$ $B^4$ of the eyelet have shanks $A^6$ $B^6$, of which the shank $B^6$ is formed on the front and rear with integral tongues $B^7$, adapted to engage notches $A^7$ in the shank $A^6$; but in this case the tongues $B^7$ are not yielding, and consequently when the shank $B^6$ is pushed into the shank $A^6$ then the sides of the shank $B^6$ spring inward, as indicated in Fig. 6, to allow the passage of the tongues $B^7$ on the shank $B^6$ until said tongues $B^7$ snap into corresponding shoulders $A^7$ in the shank $A^6$. The shanks $A^6$ and $B^6$ are formed with heads $A^8$ and $B^8$, respectively, the same as above described in reference to the members A and B.

As illustrated in the drawings, the shanks A' and $A^6$ are formed with a plurality of notches $A^3$ or $A^7$ on each side of the shank, the notches being located one above the other, so that the eyelet can be readily used on belts of different thicknesses.

Having thus fully described my invention, I claim as new and desire to secure by Letters Patent—

1. A belt-eyelet, comprising two members each having an oblong hollow undivided shank and a head, the head being in the form of a flange extending outwardly and curved inwardly, the edges of the flanges being serrated, one of the shanks being provided with a plurality of shoulders on each side and the other with a tongue on each side adapted to spring into engagement with the shoulders, as set forth.

2. A belt-eyelet, comprising two members, each having an oblong hollow undivided shank and a head, one of the shanks being of yielding material and provided with a rigid tongue on each side and the other with a plurality of shoulders on each side, whereby the opposing sides of the shank carrying the tongues will spring inward toward each other when the said shank is forced into the other shank to allow the passage of said tongues and permit them to snap into engagement with the shoulders with which they will be held in engagement by the elasticity of the sides of the shank, as set forth.

In testimony whereof I have signed my name to this specification in the presence of two subscribing witnesses.

FRANK JAMES LELAND.

Witnesses:
BEN. A. HAMILTON,
WILLIAM J. MCCOY.